Nov. 27, 1962 L. M. RUEF ET AL 3,066,093
SIMPLIFIED HYDROFINING PROCESS
Filed Nov. 29, 1956
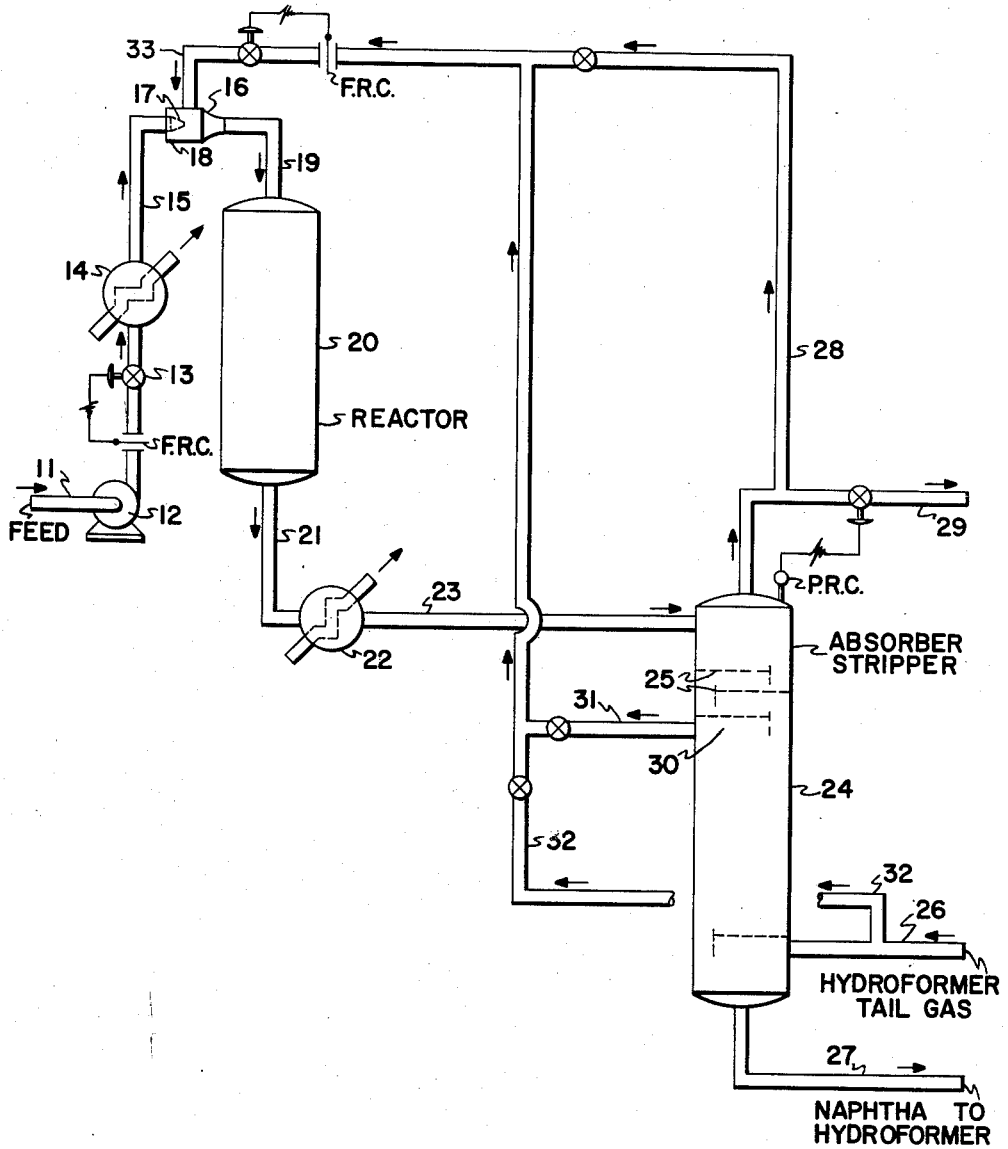
Lloyd M. Ruef
William Lockett, Jr. Inventors
By H. M. Feyrer Attorney

United States Patent Office 3,066,093
Patented Nov. 27, 1962

3,066,093
SIMPLIFIED HYDROFINING PROCESS
Lloyd M. Ruef, Clark, and William Lockett, Jr., Westfield, N.J., assignors to Esso Research and Engineering Company, a corporation of Delaware
Filed Nov. 29, 1956, Ser. No. 625,051
5 Claims. (Cl. 208—212)

This invention relates to an improved process for hydrofining hydrocarbons and relates more particularly to a more efficient process where the hydrofining reaction zone is operated under higher than ordinary pressure and in which several expensive major pieces of equipment ordinarily needed for hydrofining are eliminated.

Hydrofining is defined as an operation in which petroleum hydrocarbons are contacted with hydrogen in the presence of a catalyst at pressures of less than about 1000 p.s.i.g. and temperatures of less than about 800° F. in order to improve their quality or to prepare them for further processing. The reactions taking place under these conditions are desulfurization, removal of nitrogen and/or oxygen, and hydrogenation of unsaturated compounds. The combined results of all these reactions and a characteristic of the hydrofining process is the net consumption of hydrogen occurring therein.

Due to the increase in the use of hydroforming processes to satisfy commercial demands for higher octane gasolines, the excess hydrogen supply available therefrom has increased. Thus, of late, interest in the hydrofining process has grown, and hydrofining is now used on a wide variety of petroleum products. The present invention can be utilized to advantage in most of these processes.

According to the present invention it has been found that the hydrofiner reaction products separator and the absorber stripper feed pumps conventionally used in hydrofining may be eliminated and that the entire products from the hydrofiner reactor after the cooling step may be passed directly to the absorber stripper where they are contacted with hydroformer tail gas. The gases from the absorber stripper which are used as hydrofiner treat gas are then returned to the hydrofiner and raised to hydrofiner pressure by an eductor actuated by the high pressure naphtha feed. The desulfurized liquid hydrocarbon product is withdrawn from the bottom of the absorber stripper. Thus, substantial savings in plant investment and operating costs are secured. This process is eminently practicable, since in hydrofining naphthas for example, only about 500 s.c.f. of treat gas per barrel of naphtha are required to be compressed to reactor pressure, while an eductor operating to raise treat gas about 50 p.s.i., as in the present process, can pick up 5,000 s.c.f. of treat gas per barrel of naphtha supplied.

The invention will be more fully understood by reference to the accompanying drawing in which the hydrofining system is illustrated diagrammatically. A liquid feed hydrocarbon supplied via inlet line 11 is compressed by pump 12 to over 100 p.s.i.g. above hydrofiner reactor pressure and is then passed through flow regulator control valve and line 13 to preheater 14. In preheater 14, the pressurized feed is vaporized and raised in temperature. The vaporized feed is then passed through a line 15 to an eductor 16 wherein such high pressure feed compresses the treat gas supplied via line 33 from the top of the absorber stripper to reactor pressure.

The eductor consists of a reducing nozzle 17 for creating a high velocity jet directed into an enlarged chamber 18, the enlarged chamber 18 having a side inlet for line 33 and an outlet for line 19. The nozzle design and the proportions of the chamber are such that the sudden reduction in ambient pressure, due to the extremely high velocity in the jet draws in the treat gas from line 33 at a rapid rate and compresses it. The combined stream of vaporized feed and treat gas passes through line 19 to the hydrofiner reactor 20 where it is contacted with a cobalt molybdate, molybdena on alumina, or similar hydrofining catalyst which is in the form of lumps or pills at the usual hydrofining process temperature for the particular hydrocarbon and at a higher than usual pressure. This desirable higher reactor pressure is economically feasible in the present process because the gas ordinarily rejected from the system in the hydrofiner reaction products separator is now passed to the absorber stripper and used at the higher pressure in the hydrofiner recycle treat gas or in other hydrofining systems.

The effluent from hydrofiner reactor 20 passes through line 21 to condenser 22 and then through line 23 to absorber stripper 24 containing a number of plates, for example 25, where the hydrogen sulfide and water leaving the hydrofining reactor are stripped from the hydrofined product by means of hydroformer tail gas which is supplied to the bottom of the column through line 26. Simultaneously, the hydrofined product absorbs light ends contained in the hydroformer tail gas. Absorber stripper 24 is operated at a lower pressure than the hydrofiner reactor due to pressure drops in the condenser and lines between the two pieces of equipment. Liquid desulfurized naphtha feed product flows from the bottom of the column through line 27 ready for further processing.

From the top of the column part of the absorber stripper tail gas passes back to the eductor 16 through flow control line 28 where it is increased in pressure and is recycled to the hydrofining reactor 20, and the remainder of the absorber stripper tail gas passes out from the hydrofining system through pressure regulator control line 29. Alternate sources of treat gas for supply to the hydrofining reactor 20 are:

(1) Treat gas may be withdrawn from the absorber stripper 24 at some predetermined point 30 below the top plate of the column where the gas removed is sufficiently low in sulfur content so that it may be used in the hydrofining of certain feed stocks which require a treat gas having a low hydrogen sulfide concentration.

(2) Part or all of the treat gas may be supplied directly to line 28 by by-passing a portion of the hydroformer tail gas around the absorber stripper 24 via line 32.

The advantages of the present system are:

(1) The elimination of the conventional hydrofiner reaction products separator.

(2) The elimination of the conventional absorber stripper feed pump.

(3) Reduction in naphtha product losses in the tail gas from the above-mentioned conventional hydrofiner reaction products separator, such tail gas conventionally being discharged from the system.

(4) The higher space velocities and thus product throughput for the hydrofiner reactor allowable because of higher pressure conditions employed.

(5) The increase in yield of high pressure hydrogen-containing tail gas from the hydrofiner that can also be used in other hydrofining processes.

(6) The increase in pressure of the hydrogen-containing tail gas from the hydrofiner permitting reduced compression costs in other hydrofiner installations using said tail gas as a source of hydrogen.

(7) The simplification of hydrofining operations secured, and (8) The reduction in maintenance costs obtained.

Conventionally, a hydrofiner reaction products separator is employed to separate out the $H_2S$ containing tail gas and a pump is used thereafter to pressure the liquid back to above hydrofiner reactor pressure before passing it on to the absorber stripper. In the present invention, the separator is unnecessary since the sulfur-containing gases can be separated in the absorber stripper and since no pump is required to raise the pressure of the hydrofiner reactor products before admitting them to the absorber stripper. If a pump were required and no separator was used, compression of the gases contained in the hydrofiner reaction products stream would be quite expensive. In addition, the present invention can deliver, as hydrogen sulfide free a treat gas as desired, by using one of the alternate methods described above. Thus the separator and feed pump can be eliminated without loss in flexibility of the process, and with reduction in equipment and operating costs and a more simplified operation.

With the tail gas formerly rejected from the system by the hydrofiner reaction products separator, considerable valuable naphtha product was lost. In the present system, all the hydrofiner reactor products are passed to the absorber stripper wherein a higher pressure separation is effected, thereby increasing recovery of naphtha product from such hydrofiner effluent stream.

A large amount of valuable hydrogen containing tail gas was also rejected from the system at lower pressure in the hydrofiner reaction products separator formerly used. By the present process, high pressure hydrogen-rich tail gas from the hydrofiner may be recovered for recycle to the hydrofiner or may be passed to other hydrofining operations better suited to utilize this treat gas.

The hydrofiner reactor is operated at higher pressure in the present invention so that higher space velocities may be employed resulting in more efficient operation. This is economical because the hydrofiner tail gas by the present process may be used as recycle gas to the hydrofiner reactor and/or as treat gas for other hydrofiners. By the old processes the pressure in the hydrofiner tail gas was usually lost and it was therefore uneconomical to use a higher pressure than was necessary. Advantage 8 refers, of course, to the reduction in equipment and accompanying instrumentation obtained by the present process but refers also to the reduced maintenance required in that the eductor has no moving parts.

In order to more fully explain the invention, the following example is set forth with the understanding that it is merely illustrative of the invention and that the invention is not restricted to the specific details enumerated therein.

Example

A 59° API specific gravity 160/325° F. vapor temperature nominal cut range naphtha feed containing .083 wt. percent sulfur is fed to a suitable pump where its pressure is increased to 805 p.s.i.g. The feed is then vaporized in an exchanger and is supplied to an eductor at a temperature of 605° F. and a pressure of 675 p.s.i.g. The treat gas to be compressed by the eductor is supplied from an absorber stripper operating on the cooled hydrofiner product stream at the rate of 500 s.c.f./barrel of the high pressure feed at a pressure of 425 p.s.i.g. and a temperature of 105° to 140° F. The combined vapor-gas stream leaving the eductor is at a pressure of 480 p.s.i.g.

The hydrofiner reactor is operated at a pressure of 470 p.s.i.g. and a temperature of 550° F. and a space velocity of the reactants through the reactor of 6 volumes of feed/hour/volume of catalyst. It is charged with a cobalt molybdate catalyst comprising 13.0 wt. percent of cobalt molybdate supported on granular gamma alumina in the form of $1/8''$ pills.

Leaving the hydrofiner reactor the effluent at a temperature of 545° F. and a pressure of 450 p.s.i.g. is passed to a condenser where the temperature of the stream is reduced to 140° F. and the pressure to 445 p.s.i.g. This stream is then passed to an absorber stripper.

The combination absorber stripper containing 40 plates is operated to produce from the bottom of the column a treated naphtha hydroformer feed containing (excluding light ends) less than:

20 parts per million $H_2S$
10 parts per million residual sulfur
10 parts per million $H_2O$ The tail gas from the hydroformer recycle gas system is supplied to the bottom of the absorber stripper at a pressure of 435 p.s.i.g. and a temperature of 110° F.

The tail gas leaving the top of the absorber stripper at a pressure of 430 p.s.i.g. is split; 500 s.c.f per barrel of naphtha feed to the hydrofiner being recycled to the eductor and the remainder being passed to a gas oil hydrofiner or the like operating at a pressure of about 420 p.s.i.g. Thus, the pressure in the absorber stripper tail gas is fully utilized and no pump is required for supplying the excess tail gas to a gas oil hydrofiner or the like.

It will be understood that numerous variations may be made in the system described and that other than naphtha feeds may be hydrofined. The naphtha feed hydrofining process described, however, is typical of important systems where the present invention has high utility. Applicant's process broadly is desirable in hydrofining processes of any of the known types and obviously the catalyst, the type of bed, the reactor pressures and temperatures, and the other operating variables may be adapted to known processes as will be apparent to those skilled in the art.

What is claimed is:

1. An improved process for the hydrofining of normally liquid hydrocarbons which comprises pumping the liquid feed to a pressure of over 100 p.s.i. above the hydrofining zone pressure, heating the pressurized feed to substantially completely vaporize it using the vaporizing feed to educt a lower pressure treat gas into the hydrofining zone containing a catalyst selected from the group consisting of cobalt molybdate on alumina and molybdena on alumina permitting treat gas and the hydrocarbons to remain resident in the hydrofining zone for a period of time sufficient to effect the desired hydrofining, passing the hydrofiner reactor products stream through a condenser and thence directly to the top of an absorber stripping column, passing hydroformer tail gas into the bottom of the column to countercurrently contact the liquid hydrofiner reactor products, withdrawing desulfurized liquid hydrofiner reactor products from the bottom of the column, separately withdrawing gas containing hydrogen sulfide from the absorber stripper column, supplying at most a portion of said gas withdrawn from said column directly to the said eductor where the gas is increased in pressure by the pressurized hydrocarbon feed stream, and discharging said gas from the eductor in admixture with the hydrocarbon feed vapors into the hydrofiner reaction zone.

2. The process as in claim 1 in which the gas withdrawn from the absorber stripper column for supply to the eductor is withdrawn from the top of the column.

3. The process as in claim 1 in which the gas withdrawn from the absorber stripper column for supply to the eductor is withdrawn at a predetermined point below the top plate of the column where the gas removed is sufficiently low in sulfur content so that it may be used in the hydrofining of certain feed stocks which require a treat gas having a low hydrogen sulfide concentration.

4. The process as in claim 1 in which the absorber stripper is operated so as to strip the liquid hydrofiner reactor products of sulfur-containing impurities and water.

5. The process as in claim 1 in which the absorber stripper column is operated so that the liquid hydrofiner reactor products absorb hydrocarbon material from the hydroformer tail gas.

References Cited in the file of this patent
UNITED STATES PATENTS

| | | |
|---|---|---|
| 2,387,798 | Kubicek et al. | Oct. 20, 1945 |
| 2,671,754 | De Rosset et al. | Mar. 9, 1954 |
| 2,756,192 | Bergstrom | July 24, 1956 |